(12) United States Patent
Wachendorf et al.

(10) Patent No.: US 7,588,109 B2
(45) Date of Patent: Sep. 15, 2009

(54) DRILL ENERGIZED POWER MODULE

(76) Inventors: Marvin J. Wachendorf, 2223 E. Santan St., Chandler, AZ (US) 85225; Anthony Mattio, 700 Carnegie #1512, Henderson, NV (US) 89052

(\*) Notice: Subject to any disclaimer, the term of this patent is extended or adjusted under 35 U.S.C. 154(b) by 360 days.

(21) Appl. No.: 11/380,852

(22) Filed: Apr. 28, 2006

(65) Prior Publication Data
US 2007/0251738 A1    Nov. 1, 2007

(51) Int. Cl.
*B60S 9/215*    (2006.01)
(52) U.S. Cl. .................................... 180/202; 180/6.5
(58) Field of Classification Search ............... 180/6.5, 180/202, 220
See application file for complete search history.

(56) References Cited

U.S. PATENT DOCUMENTS

| | | | | |
|---|---|---|---|---|
| 3,156,315 A | * | 11/1964 | Hawgood | ..................... 180/13 |
| 4,280,578 A | | 7/1981 | Perkins | ........................ 180/6.5 |
| 4,671,524 A | * | 6/1987 | Haubenwallner | ........... 280/212 |
| 4,915,185 A | * | 4/1990 | Olson | ......................... 180/19.2 |
| D470,437 S | | 2/2003 | Wachendorf et al. | ........ D12/110 |
| 6,536,709 B1 | | 3/2003 | McVaugh | .................... 244/114 |
| D485,789 S | | 1/2004 | Lai | ............................. D12/111 |
| 2001/0017066 A1 | * | 8/2001 | Yaksich et al. | ................. 81/52 |

\* cited by examiner

*Primary Examiner*—Lesley D Morris
*Assistant Examiner*—Marc A Scharich
(74) *Attorney, Agent, or Firm*—The von Hellens Law Firm, Ltd.

(57) ABSTRACT

A power module provides power to move a vehicle, such as a mini-bike, and includes a portable electric drill acting through a gear box and chain drive to rotate a wheel of the vehicle.

21 Claims, 9 Drawing Sheets

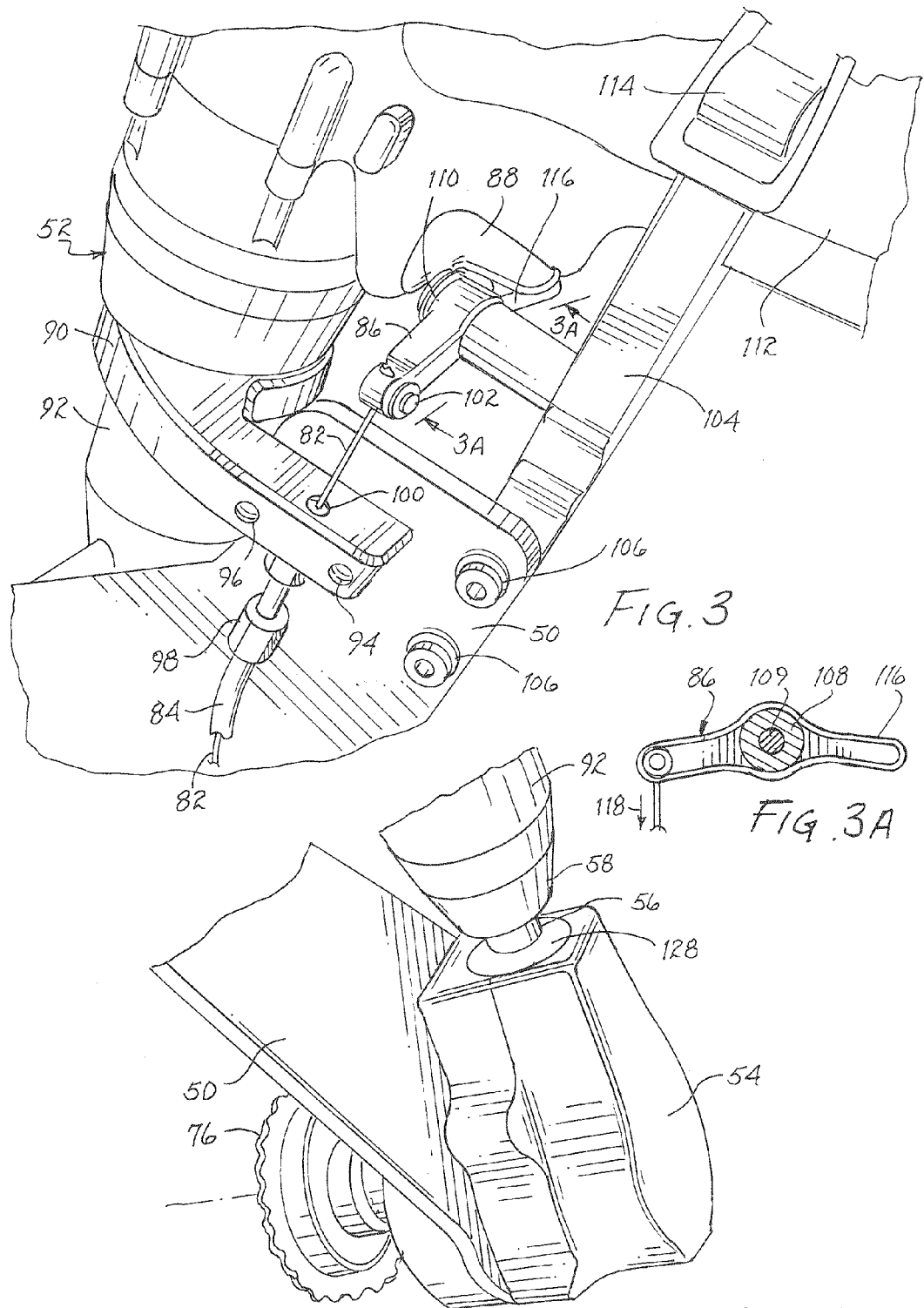

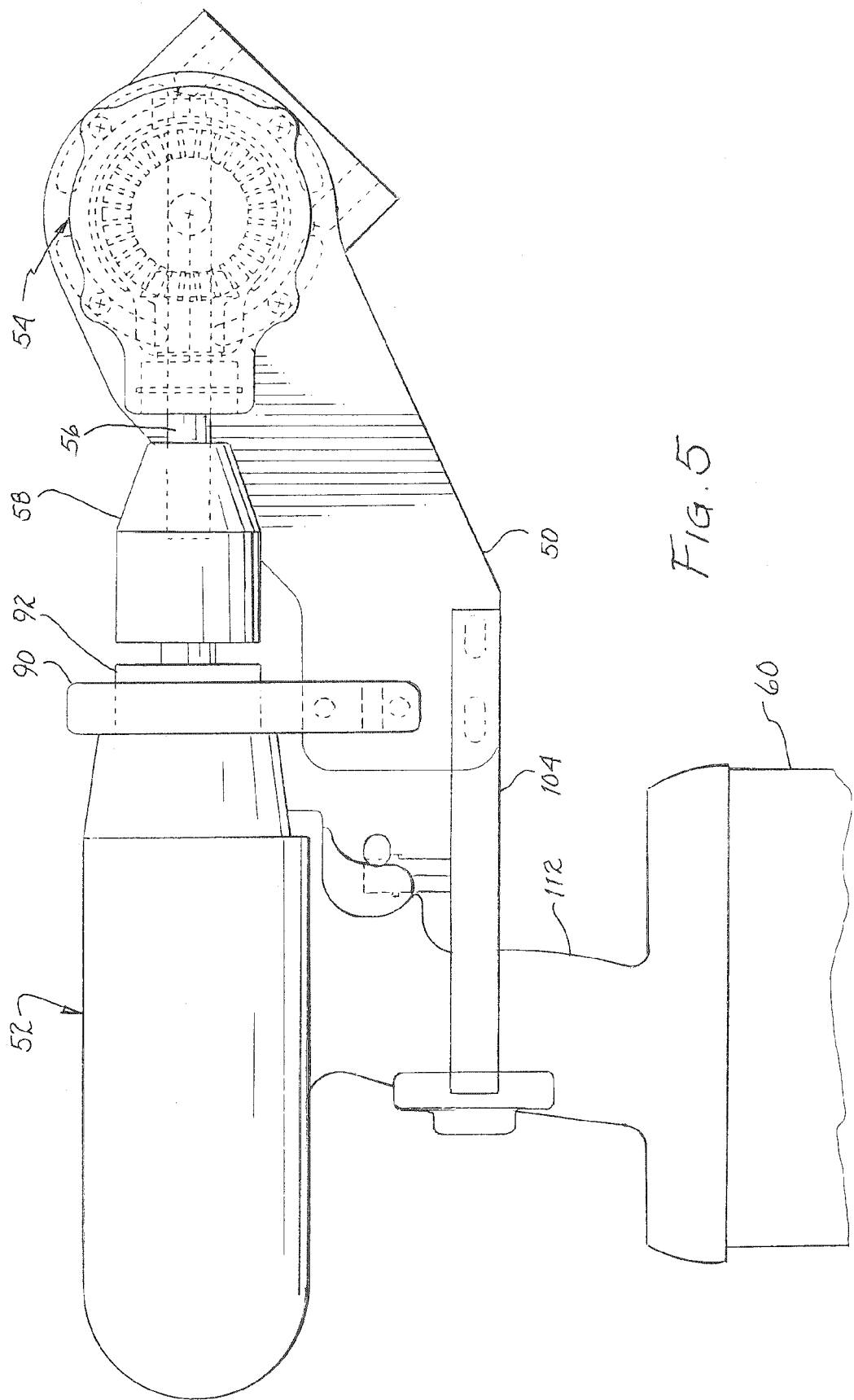

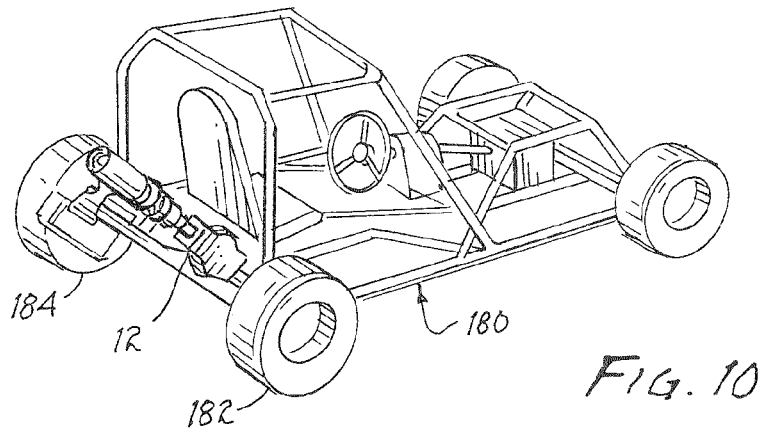
FIG. 10
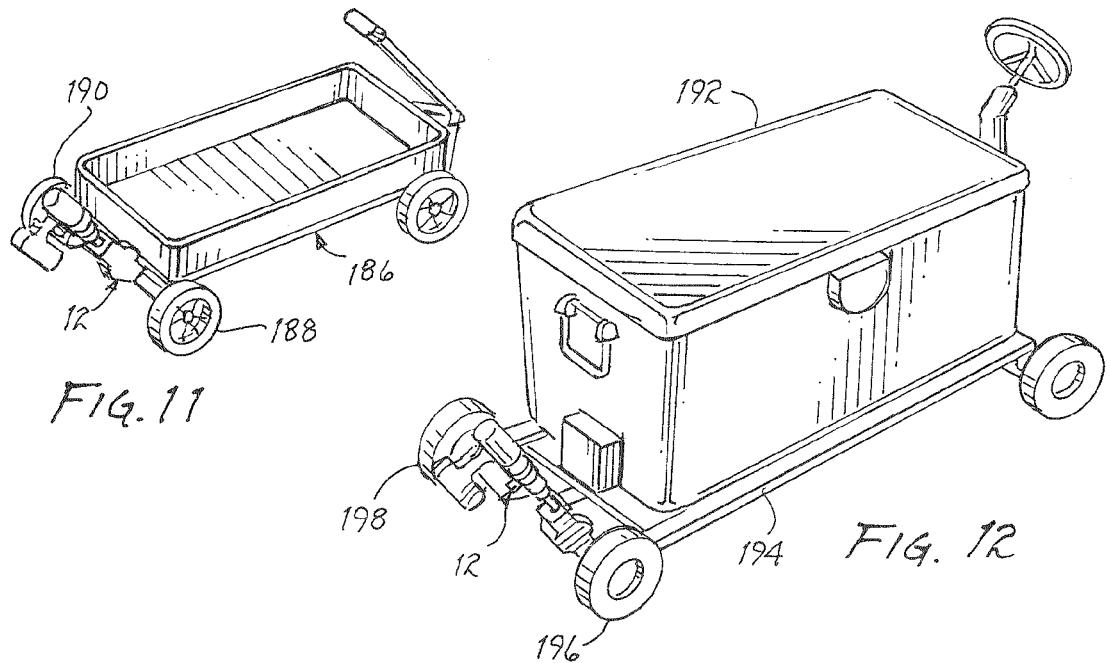
FIG. 11
FIG. 12
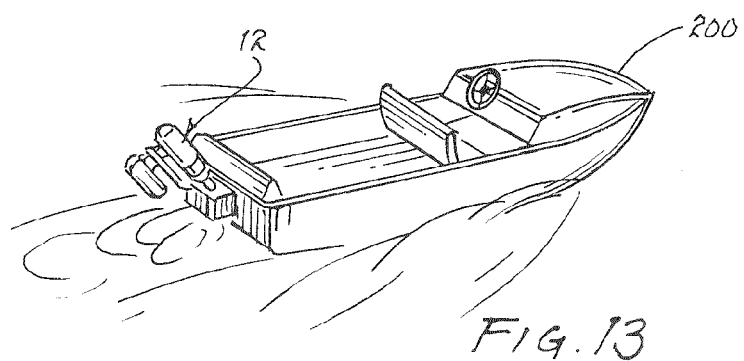
FIG. 13

DRILL ENERGIZED POWER MODULE

BACKGROUND OF THE INVENTION

1. Field of the Invention

The present invention relates to power modules for vehicles and other applications and, more particularly, to a portable electric drill energized power module.

2. Description of Related Prior Art

Conventional mini-bikes generally include an internal combustion engine to provide motive power. These engines may be powerful enough to provide a relatively high speed of travel for the mini-bikes. Usually, the sound muffling apparatus creates a sound that is more or less disturbing to bystanders. Moreover, the internal combustion engine, along with the attendant fuel tank, add significant weight to the mini-bike. Conventional electric motors might be used but require a relatively heavy conventional automotive battery. The additional weight provided by these internal combustion engines and electric motors represent a significant proportion of the weight of the mini-bike. Such weight, coupled with the weight of a rider, who may be other than a child, severely impacts the acceleration and deceleration of the mini-bike during use.

Wheel chairs having motive means in the form of an electric motor employing one or more conventional automotive or motorcycle batteries significantly increase the weight of the wheelchair. Such additional weight renders the wheelchairs difficult and awkward to move for storage purposes and the like. Furthermore, the electric motors and attendant batteries are not used in combination with collapsible wheelchairs for obvious practical reasons.

Various vehicles, such as carts and ice chests mounted on wheels, do not include any motive means and must be manually moved from one location to another. When such carts and ice chests are heavily loaded, the movement may be a strain to the person pulling or pushing the cart or ice chest. Moreover, when a significant distance is involved in the movement, a strain on the person may result, particularly if the person is of limited physical capability.

SUMMARY OF THE INVENTION

A power module includes a base supporting a gear train having an output shaft and a conventional portable electric drill operatively connected to the gear train to cause rotation of the output shaft. The conventional drill is detachably attached to fittings extending from the base. A sprocket mounted on the output shaft is coupled by a chain to a further sprocket mounted on a wheel of a vehicle, such as a mini-bike. A shelf mounted on the mini-bike or other vehicle supports a replacement battery for the drill.

It is therefore a primary object of the present invention to provide a power module for a vehicle using a conventional portable electric drill.

Another object of the present invention is to provide a base supporting an electric drill and a gear train that is attachable to a vehicle to drive a wheel of the vehicle.

Still another object of the present invention is to provide a base of a power module that is detachably attachable to a vehicle.

Yet another object of the present invention is to provide a light weight power module for use on any of a plurality of different types of vehicles to provide motive power therefor.

A further object of the present invention is to provide a power module for a vehicle that may be energized by any conventional portable electric drill.

A still further object of the present invention is to provide a universal fitting for receiving and retaining any electric drill coupled with a gear train to provide motive power to a vehicle.

A yet further object of the present invention is to provide a light weight power module for a mini-bike.

A yet further object of the present invention is to provide a method for providing motive power to a vehicle.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 3 illustrates the throttle linkage for the power module;

FIG. 3A is a partial cross sectional view taken along lines 3A-3A in FIG. 3;

FIG. 4 is a partial view illustrating the gear box interconnecting the portable electric drill and a sprocket;

FIG. 5 illustrates further details of the mounting of the electric drill and the attendant gear box;

FIG. 10 illustrates a go-cart having the power module mounted thereon;

FIG. 11 illustrates a conventional pull cart having the power module mounted thereon;

FIG. 12 illustrates a wheel mounted ice box having the power module mounted thereon;

FIG. 13 illustrates a water borne vehicle having the power module mounted thereon.

DESCRIPTION OF THE PREFERRED EMBODIMENT

Figure 1:
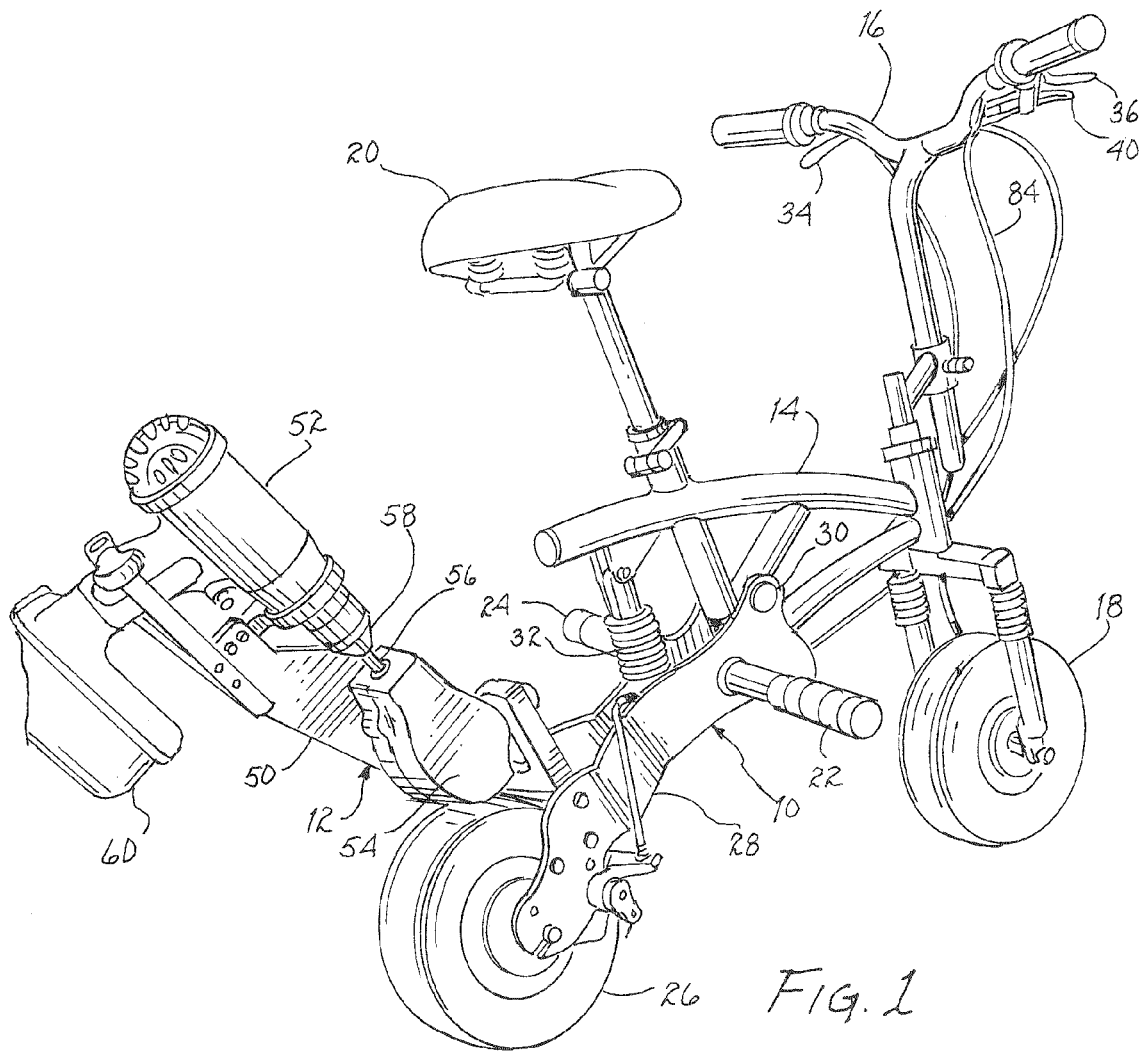
FIG. 1 illustrates a mini-bike having a power module attached thereto.

Referring to FIG. 1 there is shown a representative conventional mini-bike 10 with a power module 12 mounted thereon. The mini-bike includes a frame 14 supporting a handlebar 16 for turning a front wheel 18. A seat 20 extends from frame 14 to support a rider and pegs 22, 24 serve in the manner of foot rests. The rear wheel 26 may be pivotally attached to frame 14 by a bracket 28 pivotally mounted about pin or bolt 30. A coil spring 32 or the like interconnects bracket 28 with frame 14 and serves as part of the suspension system for the rear wheel. Brake handles 34, 36 are mounted on handlebar 16 to permit selective braking of the front or rear wheel. A manually actuated lever 40 may be mounted on the handlebar to serve in the manner of a throttle for power module 12.

The power module includes a base 50 removably supporting a conventional portable electric drill 52. The drill is coupled to a gear box 54 via a shaft 56 captured and retained by jaws 58 of the drill. Conventional portable electric drills generally include a detachably attached battery 60 to permit removal for recharging or replacement with a fully charged battery.

Figure 1A:
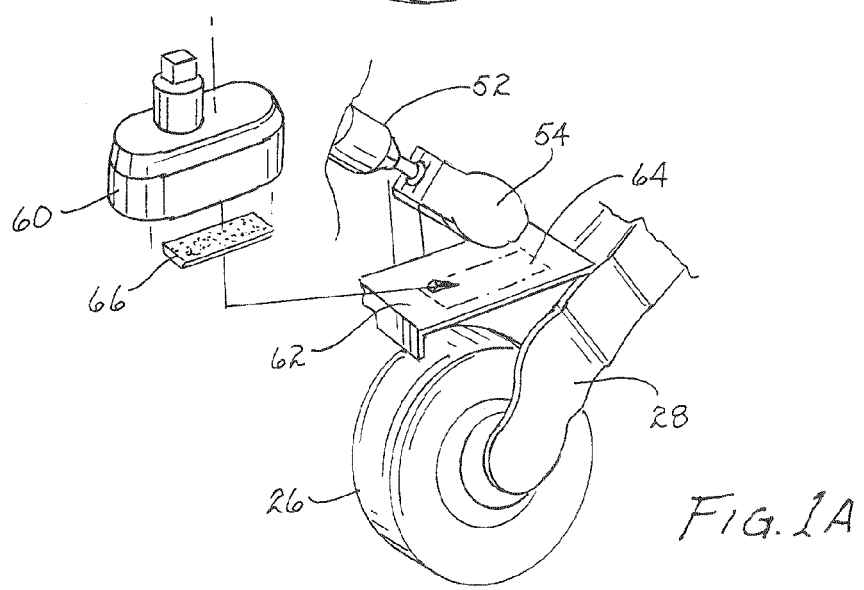
FIG. 1A illustrates a shelf for supporting an extra battery for the power module.

As shown in FIG. 1A, a shelf 62 or other support element may be incorporated or otherwise secured to frame 14 of mini-bike 10 to store a fresh battery 60. Of course, it will also serve to store a battery having a depleted electrical charge. To permit a rapid exchange of batteries, a hook and loop type fastener like the type sold under the trademark VELCRO may be disposed intermediate shelf 62 and the base of battery 60. For example, a section 64 of loop material may be attached to the shelf and a section 66 of hook material may be attached to battery 60. Thereby, the hook and loop sections will retain battery 60 upon shelf 62 and yet permit rapid removal to replace a depleted battery for drill 52.

Figure 2:
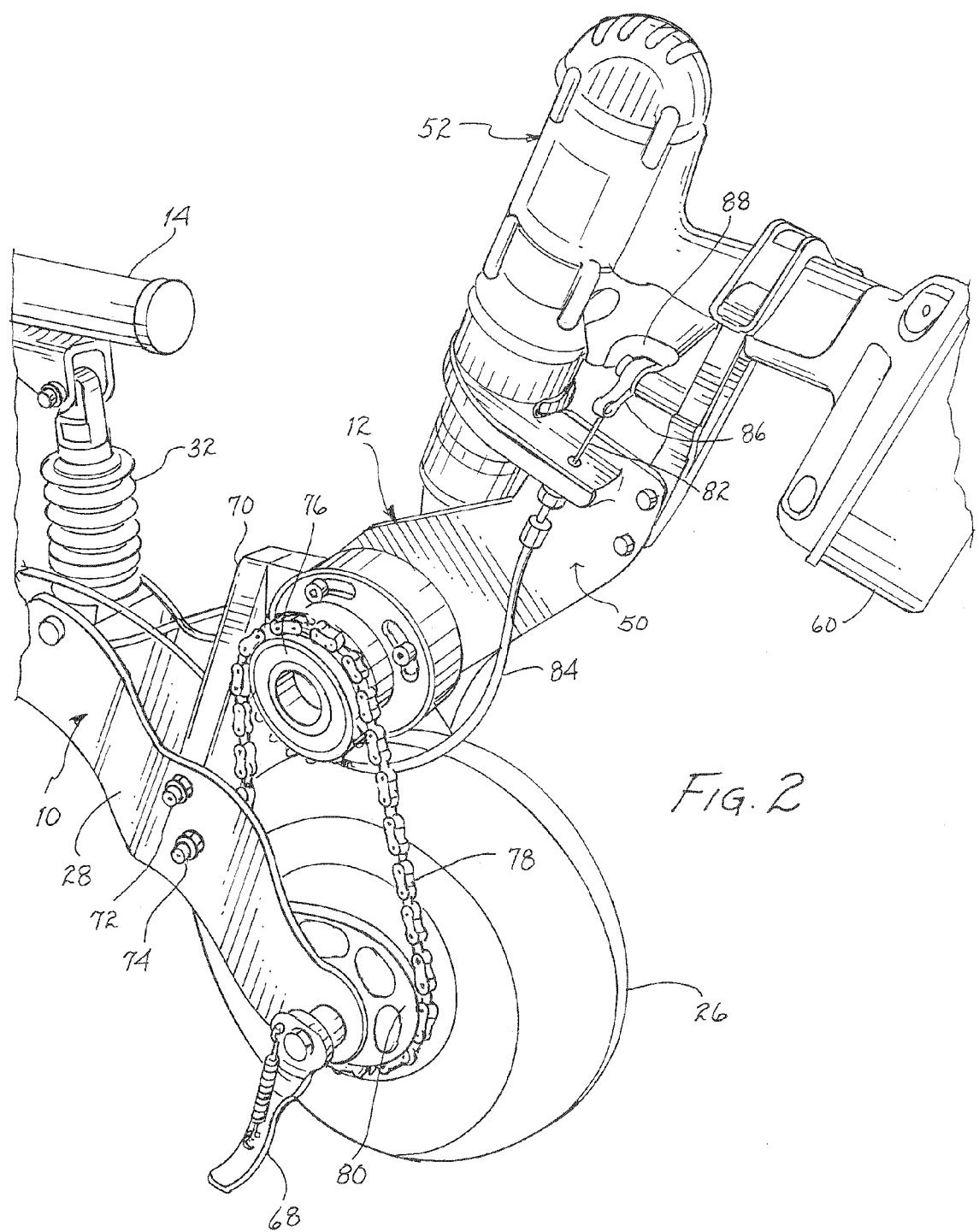
FIG. 2 illustrates the power module and the drive train interconnecting the power module with a driving wheel of a mini-bike.
Figure 6:
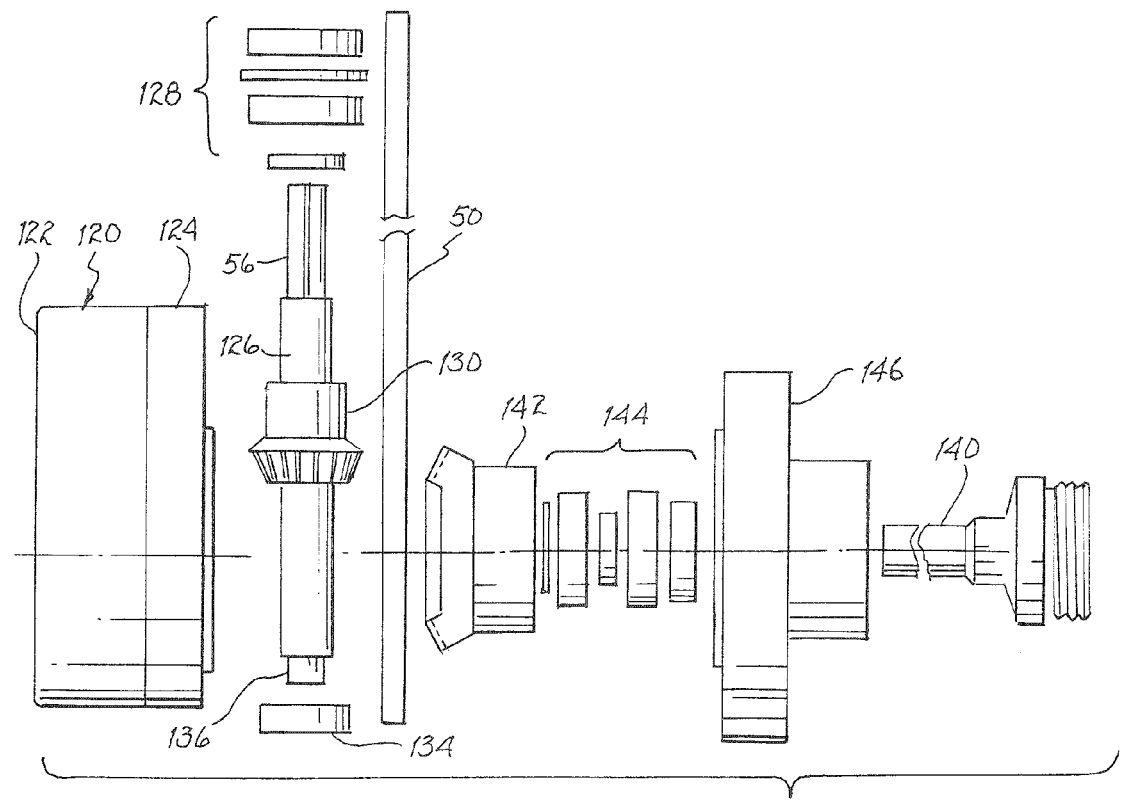
FIG. 6 is an exploded view of the gear box.
Figure 7:
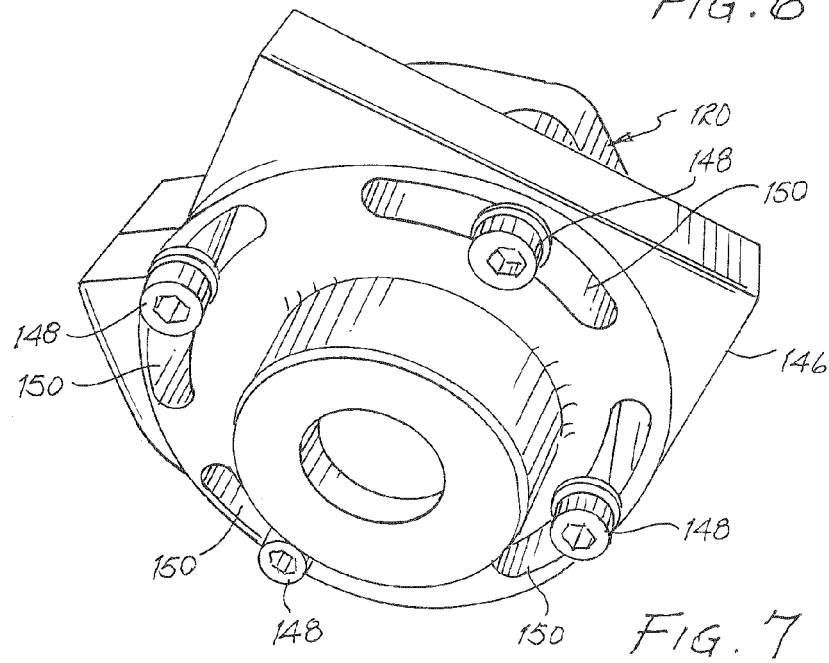
FIG. 7 illustrates a component of the gear box.

FIG. 2 illustrates an overall view of power module 12 mounted on mini-bike 10. Base 50 may be attached to bracket 28 by a mounting 70 secured by bolts 72, 74 and attendant nuts. Thereby, the base is rigidly attached to the bracket supporting rear wheel 26 and the relationship between the power module and the rear wheel is fixed and rigid. Electric drill 52, operating through gearbox 54 (see FIG. 1) causes rotation of a sprocket 76. A conventional chain 78 is in engagement with sprocket 76 and a further sprocket 80 secured to the hub of wheel 26. Accordingly, rotation of sprocket 76 will cause rotation of sprocket 80 and commensurate rotation of wheel 26.

As discussed above, lever 40 on handlebar 16 serves in the manner of a throttle. Upon movement of this lever, a cable 82 disposed within sheath 84 is connected to a pivotable lever 86. Upon movement of lever 40 on the handlebar, cable 82 causes pivotal movement of lever 86. Such pivotal movement of lever 86 will act upon trigger 88 of electric drill 52; as is well known, the trigger on an electric drill will control the rate of rotation of the chuck and jaws of the drill (see FIG. 1). Thereby, speed of rotation of sprocket 76 and resulting rotation of wheel 26 is controlled by lever 40 on the handlebar.

A kick stand 68 of a conventional type may be attached to bracket 28 or to the axle for rear wheel 26.

Referring to jointly to FIGS. 3 and 3A, further details attendant the mounting and operation of drill 52 will be described. Base 50 supports a bracket 90 having an aperture therein for receiving front end 92 of the drill. The bracket may be attached to the base by conventional nuts and bolts or machine screws penetrating base 50 into threaded engagement with passageways 94, 96 in the bracket. Sheath 84, slidably supporting cable 82, is secured to bracket 90 by elements 98 in the conventional manner. Cable 82 extends from within passageway 100 in bracket 90 and is locked with a cylinder 102 rotatably mounted in one end of lever 86. A support 104 is attached to base 50 by conventional nuts and bolts 106. A stud 108 extends from support 104 and includes a shaft 109 for pivotally mounting lever 86. A snap ring 110 or the like may be employed to retain the lever upon the supporting shaft. Handle 112 of electric drill 52 is engagable by support 104 and retained in place by a buckle 114; other locking mechanisms may also be used such as hook and loop fasteners, bungee chord, etc. For more permanent attachment, a metal strap extending about the handle and retained on support 104 by machine screws or a nut and bolt combination could be used. The combination of bracket 90 supporting the front end of the drill and support 104 retaining the handle of the drill is configured to locate trigger 88 of the drill adjacent arm 116 of lever 86. When lever 40 on handlebar 16 (see FIG. 1) is pivoted, cable 82 will be repositioned downwardly, as illustrated in FIG. 3 and represented by arrow 118 shown in FIG. 3A, which results in pivotal movement of lever 86. The resulting pivotal movement will raise arm 116 of the lever and actuate trigger 88 of the drill. Such actuation will energize the drill and cause the chuck to rotate as a function of the degree of movement of the trigger.

As particularly shown in FIGS. 4, 5, 6, 7, 8 and 9, gearbox 54, its components and its relationship to the remaining elements will be described. A housing 120 includes a cover 122 and a hollow spacer 124 for rotatably supporting shaft extension 126. Bearings and washers for accomplishing this support within the housing are collectively referred to by numeral 128. A bevel gear 130 is fixedly attached to shaft extension 126 by a set screw 132. A further bearing 134 within the housing supports lower end 136 of shaft extension of 126. A further bevel gear 138 is fixedly mounted on shaft 140 by a set screw 142 and mates with bevel gear 130 whereby rotational movement of shaft extension 126 is translated into rotational movement of shaft 140. The ratio of rotation between shaft extension 126 and shaft 140 is a function of the number of teeth in each of bevel gears 130 and 138. A plurality of bearings and washers, collectively referred to by numeral 144, rotatably support shaft 140 within housing 146. Housing 120 and housing 146 are secured to opposed sides of base 50 by bolts 148 penetrating respective ones of slots 150 in housing 146. Each of bolts 148 penetrably engages respective ones of apertures 152 in base 50, passageways 150 in spacer 124 and into threaded engagement with aligned threaded cavities in cover 122. Sprocket 76 is attached to shaft 140 in the conventional manner.

By using slots 150 in housing 146 to attach and secure base 50 and gear box 54 thereto, the angle of the base relative to housing 146 can be adjusted to meet various criteria and other considerations. Thus, the angular orientation of electric drill 52 can be adjusted in the vertical plane depicted. In installations wherein base 50 is in a plane other than vertical (as shown) the orientation may be adjusted in the corresponding plane.

Figure 9:
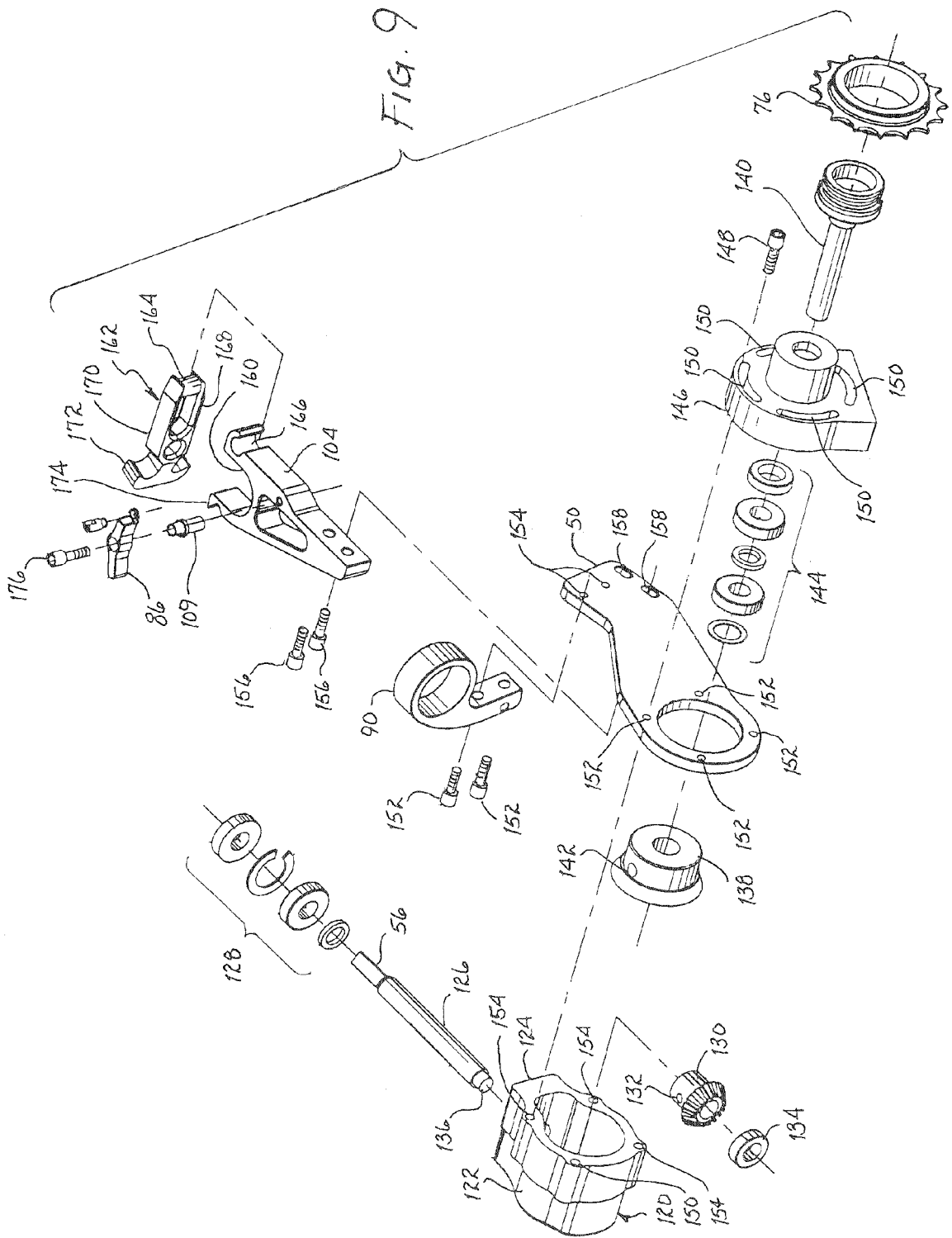
FIG. 9 illustrates an exploded view of the major components of the power module shown in FIG. 8.

As particularly shown in FIG. 9, bracket 90 is secured to base 50 by machine screws 152 threadedly engaging respective ones of apertures 154; alternatively, they may be secured by nuts. Support 104 is attached to base 50 by machine screws 156 threadedly engaging respective ones of apertures 158; alternatively, they may be secured by nuts. Support 104 may include an indentation 160 for receiving handle 112 of drill 52. To permit ease of attachment and detachment of the handle with indentation 160, a conventional elastic strap may be employed. For example, strap 162 includes a cylindrical stud 164 for insertion into slot 166. A pair of elastic straps 168, 170 extend from stud 164 to a handle 172. The handle, or a component thereof, is configured to engage and be retained by edge 174 of the support. Lever 86 is pivotally mounted on shaft 109 and may be retained thereon by a snap ring, as discussed above, or by a bolt 176, as shown in FIG. 9.

Figure 8:
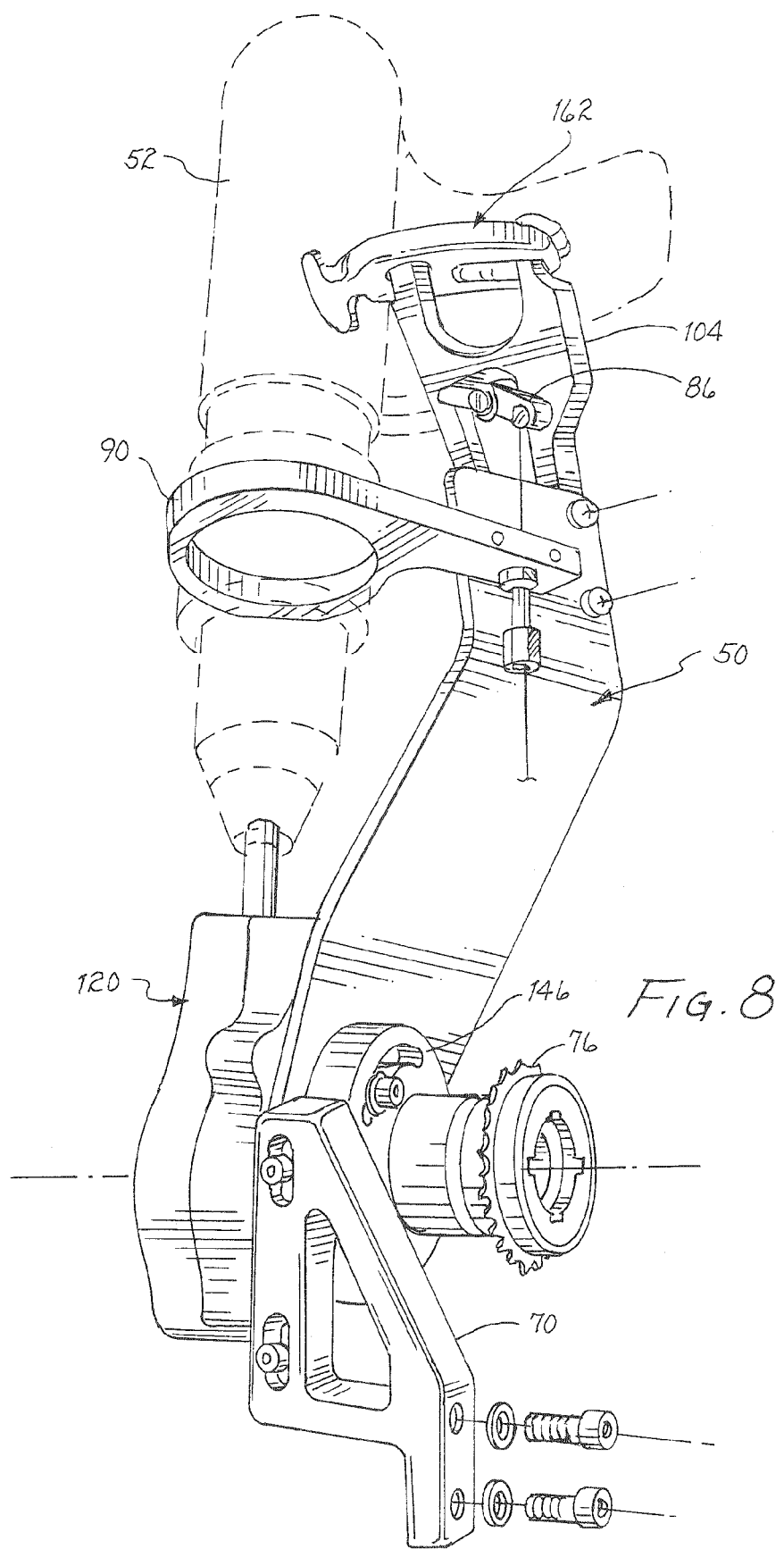
FIG. 8 illustrates the power module detachably attachable to a vehicle.

As may be deduced from FIGS. 8 and 9, bracket 90 and support 104 are universally configured to receive and retain corresponding elements of any commercially available portable electric drill. For stationary environments, a conventional electric drill energized by house current (AC) may be used in conjunction with and as part of the power module.

The present invention was developed specifically for providing a power module for use on a mini-bike. However, the power module, particularly as shown in FIG. 8, is adaptable for use on any of numerous wheeled vehicles or other vehicles. Moreover, it can be adapted for use in any of many other locations wherein a source of power would be beneficial.

FIG. 10 illustrates a power module 12 mounted on a go-cart 180 for driving one or both of rear wheels 182, 184. FIG. 11 illustrates a power module 12 for use in conjunction with a conventional pull wagon 186. The power module may be interconnected with either of wheels 188, 190 to provide motive power and assist in pulling the wagon. FIG. 12 illustrates an ice chest 192 mounted on a wheel supported platform 194. Herein, power module 12 may be used to drive either or both of wheels 196, 198. There are some commercially available ice chests that include wheels mounted directly thereon. For such configuration of an ice chest, power module 12 may be attached directly to the ice chest for driving one or more of the wheels. FIG. 13 illustrates a water borne craft 200 having power module 12 mounted thereon for driving a propeller, a paddle wheel or similar device provide propulsion for the water borne craft.

Figure 14:
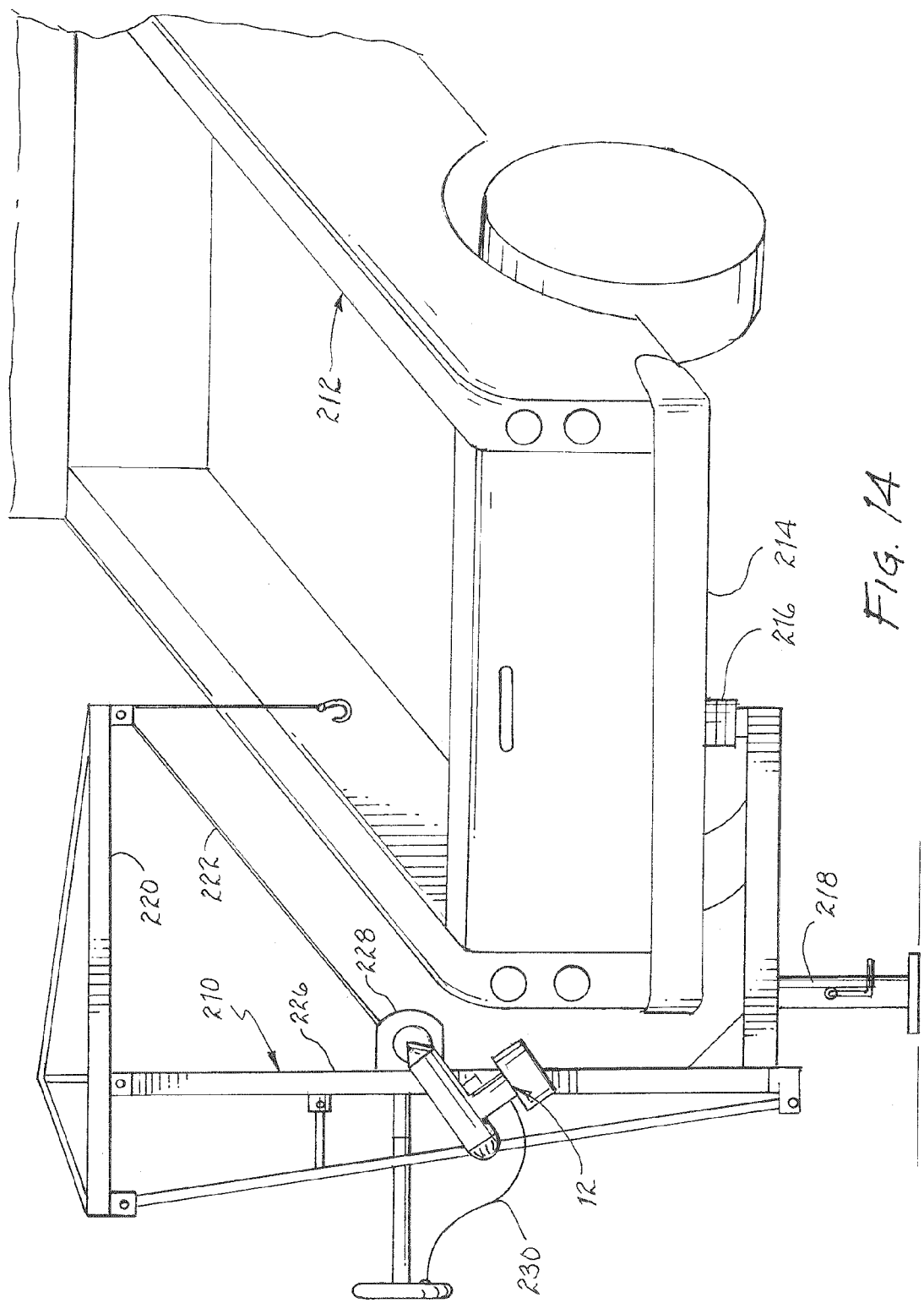
FIG. 14 illustrates a power module providing power to a truck mounted hoist.

Aside from vehicles, it is contemplated that power module 12 may be used in conjunction with other devices. For example, the power module could provide motive power to a hoist, as shown in FIG. 14. Herein, a hoist 210 is mounted at the rear of a truck 212. The hoist may be pivotally mounted to frame 214 of the truck by pivot mechanism 216. A jack stand 218 may be used to provide vertical support. An arm 220 supports a cable 222 having a hook 224 depending therefrom. A power module 12, as described and illustrated with respect to FIG. 8, is attached to upright 226. The power module selectively drives a pulley mechanism 228 to permit extension and retraction of cable 222. A lanyard 230, or the like, may be used to actuate the trigger of the drill and thereby energize the power module.

Numerous other environments wherein motive power would be beneficial can be imagined and it is contemplated that power module 12 could be used in conjunction therewith.

We claim:

1. A power module for providing motive power to at least one wheel of a vehicle, said power module comprising in combination:
    a) a base adapted for mounting on the vehicle;
    b) support means for supporting a portable electric drill on said base, the drill including a trigger for actuating the drill and a cable actuated lever mounted on said base for actuating the trigger;
    c) a gear box mounted on said base externally of said drill and adapted to receive rotary motion from the drill to rotate an output shaft; and
    d) a drive train interconnecting said output shaft with the at least one wheel of the vehicle.

2. The power module as set forth in claim 1, wherein said support means is mounted on said base for detachably attaching the drill to said base.

3. The power module as set forth in claim 1, including means for adjusting an angle of said base relative to the vehicle.

4. A power module for providing motive power to at least one wheel of a vehicle, said power module comprising in combination:
    a) a base adapted for mounting on the vehicle;
    b) support means for supporting a portable electric drill on said base including a support mounted on said base for detachably attaching the drill to said base;
    c) a bracket attached to said base for receiving a front end of the drill and wherein said support includes an indentation for receiving a handle of the drill;
    d) a gear box mounted on said base adapted to receive rotary motion from the drill to rotate an output shaft; and
    e) a drive train interconnecting said output shaft with the at least one wheel of the vehicle.

5. The power module as set forth in claim 4, including elastic means for retaining the handle in said indentation.

6. A power module for providing motive power to at least one wheel of a vehicle, said power module comprising in combination:
    a) a base adapted for mounting on the vehicle;
    b) support means for supporting a portable electric drill on said base;
    c) a gear box mounted on said base adapted to receive rotary motion from the drill to rotate an output shaft, said gear box including a rotatable shaft adapted for being gripped by jaws of the drill, said output shaft being coupled to said rotatable shaft through bevel gears; and
    d) a drive train interconnecting said output shaft with the at least one wheel of the vehicle.

7. The power module as set forth in claim 6, wherein said gear box includes a housing for supporting said rotatable shaft and a further housing for supporting said output shaft.

8. The power module as set forth in claim 7, wherein said housing is disposed on one side of said base and said further housing is disposed on the other side of said base.

9. A power module for providing motive power to at least one wheel of a vehicle, said power module comprising in combination:
    a) a base adapted for mounting on the vehicle;
    b) support means for supporting a portable electric drill on said base;
    c) a gear box mounted on said base externally of said drill and adapted to receive rotary motion from the drill to rotate an output shaft; and
    d) a drive train interconnecting said output shaft with the at least one wheel of the vehicle, said drive train including a sprocket mounted on said output shaft, a further sprocket mounted on a wheel of the vehicle and a chain interconnecting said sprocket and said further sprocket.

10. The power module as set forth in claim 9, wherein the drill includes a trigger for actuating the drill and including a cable actuated lever mounted on said base for actuating the trigger.

11. The power module as set forth in claim 10, wherein said gear box includes a rotatable shaft adapted for being gripped by jaws of the drill.

12. The power module as set forth in claim 11, wherein said output shaft is coupled to said rotatable shaft through bevel gears.

13. The power module as set forth in claim 12, wherein said gear box includes a housing for supporting said rotatable shaft and a further housing for supporting said output shaft.

14. A power module for providing motive power to a wheel of a vehicle, said power module comprising in combination:
    a) a base adapted for mounting on the vehicle;
    b) a portable electric drill for providing rotary power;
    c) support means for detachably mounting said drill on said base;
    d) a gear box mounted on said base externally of said drill and including a rotatable shaft for engagement by jaws of said drill and an output shaft rotatably responsive to rotation of said rotatable shaft;
    e) a drive train interconnecting said output shaft with a wheel of the vehicle; and
    f) said drill including a trigger for actuating said drill and including a cable actuated lever receiving support from said base for actuating said trigger.

15. The power module as set forth in claim 14, including a bracket extending from said base for receiving a front end of said drill and said support means including an indentation for receiving and retaining a handle of said drill.

16. The power module as set forth in claim 14, including means for adjusting an angle of said base relative to the vehicle.

17. A power module for providing power to actuate a device, said power module comprising in combination:
 a) a base adapted for mounting on the device;
 b) a portable electric drill for providing rotary motion;
 c) support means for supporting said drill on said base;
 d) a gear box mounted on said base externally of said drill and adapted to receive rotary motion from said drill to rotate an output shaft; and
 e) a drive train interconnecting said output shaft with the device to provide rotary power to the device, said drive train including a sprocket mounted on said output shaft, a further sprocket mounted on a wheel of the device and a chain interconnecting said sprocket and said further sprocket.

18. The power module as set forth in claim 17, wherein said support means includes means for detachably attaching said drill to said base.

19. The power module as set forth in claim 18, wherein said drill includes a trigger for actuating said drill and a lever adapted for engaging and positioning said trigger to control the rotary motion imparted by said drill.

20. A power module for providing power to actuate a device, said power module comprising in combination:
 a) a base adapted for mounting on the device;
 b) a portable electric drill for providing rotary motion, said drill including a trigger for actuating said drill and a lever adapted for engaging and positioning said trigger to control the rotary motion imparted by said drill;
 c) support means for supporting said drill on said base, said support means including means for detachably attaching said drill to said base;
 d) said support means including a bracket for supporting a front end of said drill and an indentation for receiving a handle of said drill;
 e) a gear box mounted on said base externally of said drill adapted to receive rotary motion from said drill to rotate an output shaft; and
 f) a drive train interconnecting said output shalt with the device to provide rotary power to the device.

21. The power module as set forth in claim 20, including means for adjusting an angle of said base relative to the device.

\* \* \* \* \*